United States Patent
Miao

(10) Patent No.: US 11,343,572 B2
(45) Date of Patent: May 24, 2022

(54) METHOD, APPARATUS FOR CONTENT RECOMMENDATION, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventor: Shiqian Miao, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/021,078

(22) Filed: Sep. 15, 2020

(65) Prior Publication Data
US 2021/0297743 A1    Sep. 23, 2021

(30) Foreign Application Priority Data

Mar. 17, 2020    (CN) .......................... 202010188379.9

(51) Int. Cl.
*H04N 21/466* (2011.01)
*H04N 21/45* (2011.01)
*H04N 21/81* (2011.01)

(52) U.S. Cl.
CPC ..... *H04N 21/4667* (2013.01); *H04N 21/4532* (2013.01); *H04N 21/816* (2013.01)

(58) Field of Classification Search
None
See application file for complete search history.

(56) References Cited

U.S. PATENT DOCUMENTS

| 2013/0080907 A1* | 3/2013 | Skelton ............. H04N 21/4667 715/738 |
| 2016/0044357 A1* | 2/2016 | Wang ..................... H04H 20/40 725/14 |

(Continued)

FOREIGN PATENT DOCUMENTS

EP    3136257 A2    3/2017

OTHER PUBLICATIONS

Extended European Search Report of European application No. 20215619.6 dated May 25, 2021, 12 pages.

(Continued)

*Primary Examiner* — Jefferey F Harold
*Assistant Examiner* — Charles N Hicks
(74) *Attorney, Agent, or Firm* — Brooks Kushman P.C.

(57) ABSTRACT

A method, an apparatus for content recommendation, an electronic device and a storage medium are disclosed. The method may include: for a user to be recommended, obtaining candidate contents to be recommended and at least one user feature tag for the user; determining a recommendation scheme according to the candidate contents and the at least one user feature tag, including respective proportions of different types of candidate contents in N pieces of recommended contents recommended to the user, the N pieces of recommended contents selected from the candidate contents according to the proportions, and an order of displaying the recommended contents in the N pieces of recommended contents, N is a positive integer greater than one and less than or equal to the number of candidate contents; and returning the recommended contents to the user according to the recommendation scheme.

17 Claims, 3 Drawing Sheets

(56) References Cited

U.S. PATENT DOCUMENTS

2017/0060835 A1    3/2017  Radford et al.
2017/0195731 A1*   7/2017  Girlando ............ H04N 21/4668
2018/0173694 A1    6/2018  Liu et al.
2020/0005196 A1    1/2020  Cai et al.

OTHER PUBLICATIONS

Extended European Search Report of European Application No. 21173906.5 dated Sep. 8, 2021, 8 pages.
Mateusz et al., "Text Classifiers for Automatic Articles Categorization", Artificial Intelligence and Soft Computing, Springer Berlin Heidlberg, Berlin, pp. 196-204, Apr. 29, 2012, XP019176092, ISBN: 978-3-642-29349-8.
Tan et al., "Entity Linking for Queries by Searching Wikipedia Sentences", Proceedings of the 2017 Conference on Empirical Methods in Natural Language Processing, Apr. 10, 2017, pp. 68-77, XP055836152.

* cited by examiner

… (1) METHOD, APPARATUS FOR CONTENT RECOMMENDATION, ELECTRONIC DEVICE AND STORAGE MEDIUM

CROSS-REFERENCE TO RELATED APPLICATIONS

The present application claims the priority of Chinese Patent Application No. 2020101883799, filed on Mar. 17, 2020. The disclosure of the above application is incorporated herein by reference in its entirety.

TECHNICAL FIELD

The present disclosure relates to computer application technologies, and particularly to a method and apparatus for content recommendation, electronic device and storage medium in the field of Mobile Internet.

BACKGROUND

At present, when contents are recommended to a user, the recommended contents usually include a plurality of different types of contents of different scenarios, such as image and text, video and live broadcast. These different types of contents are usually combined in a fixed proportion and then displayed to the user in a fixed order.

SUMMARY

In view of the above, the present disclosure provides a method and an apparatus for content recommendation, an electronic device and a storage medium.

According to some embodiments, a method for content recommendation includes: obtaining candidate contents to be recommended and at least one user feature tag for the user to be recommended; determining a recommendation scheme according to the candidate contents and the at least one user feature tag, including respective proportions of different types of candidate contents in N pieces of recommended contents recommended to the user, the N pieces of recommended contents selected from the candidate contents according to the proportions, and an order of displaying the recommended contents in the N pieces of recommended contents, where N is a positive integer greater than one and less than or equal to the number of candidate contents; and returning the recommended contents to the user according to the recommendation scheme.

According to some embodiments of the present disclosure, the at least one user feature tag is generated based on the collected predetermined information of the user, and the predetermined information includes: user basic attribute information and the user behavior information of the user for historical recommended contents.

According to some embodiments of the present disclosure, the method further includes: optimizing and updating periodically the at least one user feature tag according to collected latest predetermined information.

According to some embodiments of the present disclosure, the determining a recommendation scheme according to the candidate contents and the at least one user feature tag includes: inputting the candidate contents and the at least one user feature tag into a first recommendation model obtained by pre-training to obtain the recommendation scheme output from the first recommendation model.

According to some embodiments of the present disclosure, the first recommendation model is trained by: constructing training samples according to the collected user behavior information of different users for historical recommended contents, and obtaining the first recommendation model by training with the training samples.

According to some embodiments of the present disclosure, the method further includes: optimizing and updating the first recommendation model periodically according to collected latest user behavior information: and/or obtaining a second recommendation model, performing a small-stream experiment on the second recommendation model, and replacing the first recommendation model with the second recommendation model in response to determining according to results of the small-stream experiment that the second recommendation model is better than the first recommendation model.

According to some embodiments of the present disclosure, the performing a small-stream experiment on the second recommendation mode includes: upon determining the recommendation scheme according to the candidate contents and the at least one user feature tag, determining whether the user hits the small-stream experiment, if the user hits the small-stream experiment, inputting the candidate contents and the at least one user feature tag into the second recommendation model to obtain the recommendation scheme output from the second recommendation model, or if the user does not hit the small-stream experiment, inputting the candidate contents and the at least one user feature tag into the first recommendation model to obtain the recommendation scheme output from the first recommendation model; and the determining according to results of the small-stream experiment that the second recommendation model is better than the first recommendation model includes: comparing a recommendation effect of the second recommendation model with a recommendation effect of the first recommendation model, and determining that the second recommendation model is better than the first recommendation model in response to determining that the recommendation effect of the second recommendation model is better than the recommendation effect of the first recommendation model.

According to some embodiments, an apparatus for content recommendation includes: an information obtaining unit configured to obtain candidate contents to be recommended and at least one user feature tag for a user to be recommended; a content recommendation unit configured to determine a recommendation scheme according to the candidate contents and the at least one user feature tag, including respective proportions of different types of candidate contents in N pieces of recommended contents recommended to the user, the N pieces of recommended contents selected from the candidate contents according to the proportions, and an order of displaying the recommended contents in the N pieces of recommended contents, where N is a positive integer greater than one and less than or equal to the number of candidate contents; and return the recommended contents to the user according to the recommendation scheme.

According to some embodiments of the present disclosure, the apparatus further includes: a first pre-processing unit configured to generate the at least one user feature tag based on the collected predetermined information of the user; the predetermined information includes: user basic attribute information and the user behavior information of the user for historical recommended contents.

According to some embodiments of the present disclosure, the first pre-processing unit is further configured to optimize and update periodically the at least one user feature tag according to the collected latest predetermined information.

According to some embodiments of the present disclosure, the content recommendation unit inputs the candidate contents and at least one user feature tag into a first recommendation model obtained by pre-training to obtain the recommendation scheme output from the first recommendation model.

According to some embodiments of the present disclosure, the apparatus further includes: a second pre-processing unit configured to construct training samples according to the collected user behavior information of different users for historical recommended contents, and obtain the first recommendation model by training with the training samples.

According to some embodiments of the present disclosure, the second pre-processing unit is further configured to optimize and update periodically the first recommendation model according to the latest-collected user behavior information; and/or, the second pre-processing unit is further configured to obtain a second recommendation model, perform a small-stream experiment on the second recommendation model via the content recommendation unit, and replace the first recommendation model with the second recommendation model in response to determining according to results of the small-stream experiment that the second recommendation model is better than the first recommendation model.

According to some embodiments of the present disclosure, upon determining the recommendation scheme according to the candidate contents and at least one user feature tag, the content recommendation unit determines whether the user hits the small-stream experiment, if the user hits the small-stream experiment, inputs the candidate contents and the at least one user feature tag into the second recommendation model to obtain the recommendation scheme output from the second recommendation model, or if the user does not hit the small-stream experiment, inputs the candidate contents and the at least one user feature tag into the first recommendation model to obtain the recommendation scheme output from the first recommendation model; the second pre-processing unit compares a recommendation effect of the second recommendation model with a recommendation effect of the first recommendation model, and determines that the second recommendation model is better than the first recommendation model in response to determining that the recommendation effect of the second recommendation model is better than the recommendation effect of the first recommendation model.

According to some embodiments, an electronic device includes: at least one processor; and a storage communicatively connected with the at least one processor; wherein, the storage stores instructions executable by the at least one processor, and the instructions are executed by the at least one processor to enable the at least one processor to perform the above method.

According to some embodiments, a non-transitory computer-readable storage medium storing computer instructions therein, where the computer instructions are used to cause the computer to perform the above method.

BRIEF DESCRIPTION OF THE DRAWINGS

The figures are intended to facilitate understanding the solutions, not to limit the present disclosure. In the figures.

DETAILED DESCRIPTION

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, it should be appreciated that the term "and/or" used in the text is only an association relationship depicting associated objects and represents that three relations might exist, for example, A and/or B may represent three cases, namely, A exists individually, both A and B coexist, and B exists individually. In addition, the symbol "/" in the text generally indicates associated objects before and after the symbol are in an "or" relationship.

Figure 1:
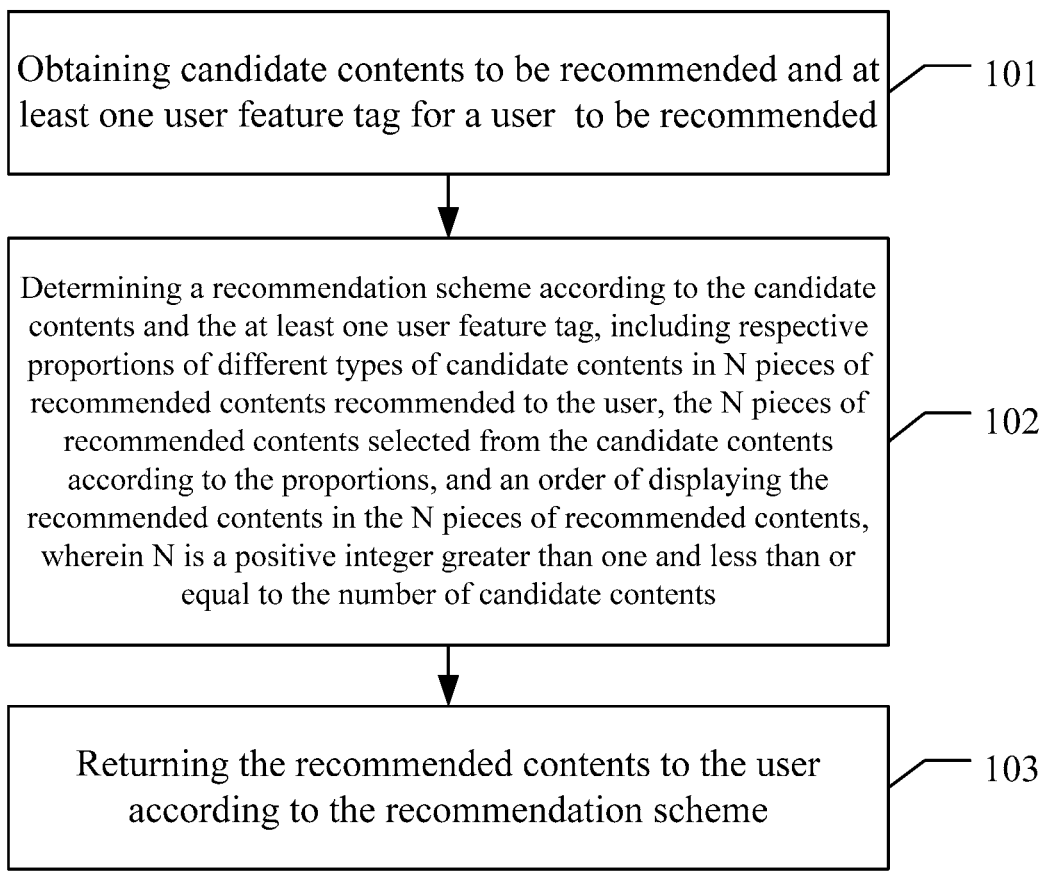
FIG. 1 illustrates a flow chart of a method for content recommendation according to some embodiments of the present disclosure.

FIG. 1 illustrates a flow chart of a method for content recommendation according to some embodiments of the present disclosure. As shown in FIG. 1, the method includes the following specific implementation mode.

At 101, candidate contents to be recommended and at least one user feature tag of a user are obtained for the user to be recommended.

At 102, a recommendation scheme is determined according to the candidate contents and the at least one user feature tag, including respective proportions of different types of candidate contents in N pieces of recommended contents recommended to the user, the N pieces of recommended contents selected from the candidate contents according to the proportions, and an order of displaying the recommended contents in the N pieces of recommended contents; where N is a positive integer greater than one and less than or equal to the number of candidate contents.

At 103, recommended contents are returned to the user according to the determined recommendation scheme.

For any user, such as a user using a content recommendation APP, when content recommendation is to be performed, the candidate contents to be recommended and the at least one user feature tag of the user may be first obtained.

How to obtain the candidate contents to be recommended is known in the prior art. The candidate contents may include different types of contents such as text and image, video and live broadcast.

The at least one user feature tag may be pre-generated, and may be generated based on collected predetermined information. The predetermined information may include: user basic attribute information and user behavior information of the user for historical recommended contents.

The user basic attribute information may include the user's age, gender, education level, etc., and a method of collecting the user basic attribute information is not limited.

When the user uses the content recommendation APP, the user behavior information of the user for the recommended contents may be collected and stored in real time, so that the user behavior information of the user for the historical recommended contents can be obtained. The user behavior information may include a type or types of contents clicked by the user, click time, browsing duration, a type of contents clicked by the user after he clicks a certain type of contents, etc. The specific information included in the user behavior information may depend on actual needs. In principle, the more detailed the better. A real-time streaming technology may be used to collect the user behavior information. The real-time streaming technology may include spark and kafka. The collected user behavior information may be stored in a distributed storage system, such as hadoop.

In addition to the above-mentioned user basic attribute information and user behavior information, the predetermined information may also include other information. The specific information included may also depend on actual needs. For example, the predetermined information may also include other information collected due to service requirements after the services are expanded later.

At least one user feature tag, such as a plurality of user feature tags may be generated according to the collected predetermined information, i.e., the collected predetermined information may be sorted into the user feature tags according to certain dimensions, such as youth, master degree, high salary, star chasing, science fiction movies, etc. These user feature tags can reflect the user attributes and user points of interest, etc.

For example, the at least one user feature tag may also be optimized and updated periodically according to the latest-collected predetermined information, e.g., optimized and updated at a predetermined time each day, so that the at least one user feature tag can be updated in time with changes in the user's points of interest, and reflect the user's latest points of interest, etc.

After the candidate contents and the at least one user feature tag are obtained, the recommendation scheme may be determined according to the candidate contents and the at least one user feature tag, including: respective proportions of different types of candidate contents in N pieces of recommended contents recommended to the user, the N pieces of recommended contents selected from the candidate contents according to the proportions, and an order of displaying the recommended contents in the N pieces of recommended contents. N is a positive integer greater than one and less than or equal to the number of candidate contents. The specific value of N may depend on actual needs. For example, 20 pieces of contents may be recommended to the user.

For example, the candidate contents and the at least one user feature tag may be input to a first recommendation model obtained by pre-training, to obtain the recommendation scheme output from the first recommendation model.

To this end, training samples may be constructed in advance based on collected user behavior information of different users for historical recommended contents, and the first recommendation model may be trained with the training samples. In addition, it is also possible to construct test samples according to the user behavior information, and use the test samples to test/verify the effect of the first recommendation model. How to construct training samples and test samples is known in the prior art. When the first recommendation model is trained, the training also needs to be performed in conjunction with the at least one user feature tag.

In addition, the first recommendation model may also be optimized and updated periodically according to collected latest user behavior information, e.g., optimized and updated at a predetermined time each day, i.e., optimized constantly based on online user feedback learning.

And/or, a second recommendation model may be obtained. A small-stream experiment may be performed on the second recommendation model. If it is determined according to results of the steam experiment that the second recommendation model is better than the first recommendation model, the second recommendation model may be used to replace the first recommendation model.

The second recommendation model may be a new version of recommendation model developed by R&D engineers. For example, compared with the first recommendation model, the structure or algorithm of the second recommendation model might change. The small-stream experiment may be performed to determine the effect of the second recommendation model. For example, most users may be allowed to still use the first recommendation model, and a small number of users may be allowed use the second recommendation model, and then recommendation effects may be compared, i.e., the recommendation effect of the second recommendation model is compared with the recommendation effect of the first recommendation model. If the recommendation effect of the second recommendation model is better than that of the first recommendation model, it may be determined that the second recommendation model is better than the first recommendation model.

The recommendation effect may be measured by data indices, such as an amount of exposure of the contents, clicks, click-through rate, browsing duration, etc. If the indices tend to grow when the second recommendation model is employed, the second recommendation model may be used to replace the first recommendation model, and all users may use the second recommendation model.

Correspondingly, when the recommendation scheme needs to be determined according to the candidate contents and at least one user feature tag, it may be first determined whether the user hits the small-stream experiment. If it is determined that the user hits the small-stream experiment, the candidate contents and at least one user feature tag may be input into the second recommendation model to obtain the output recommendation scheme. If it is determined that the user does not hit the small-stream experiment, the candidate contents and at least one user feature tag may be input into the first recommendation model to obtain the output recommendation scheme.

Figure 2:
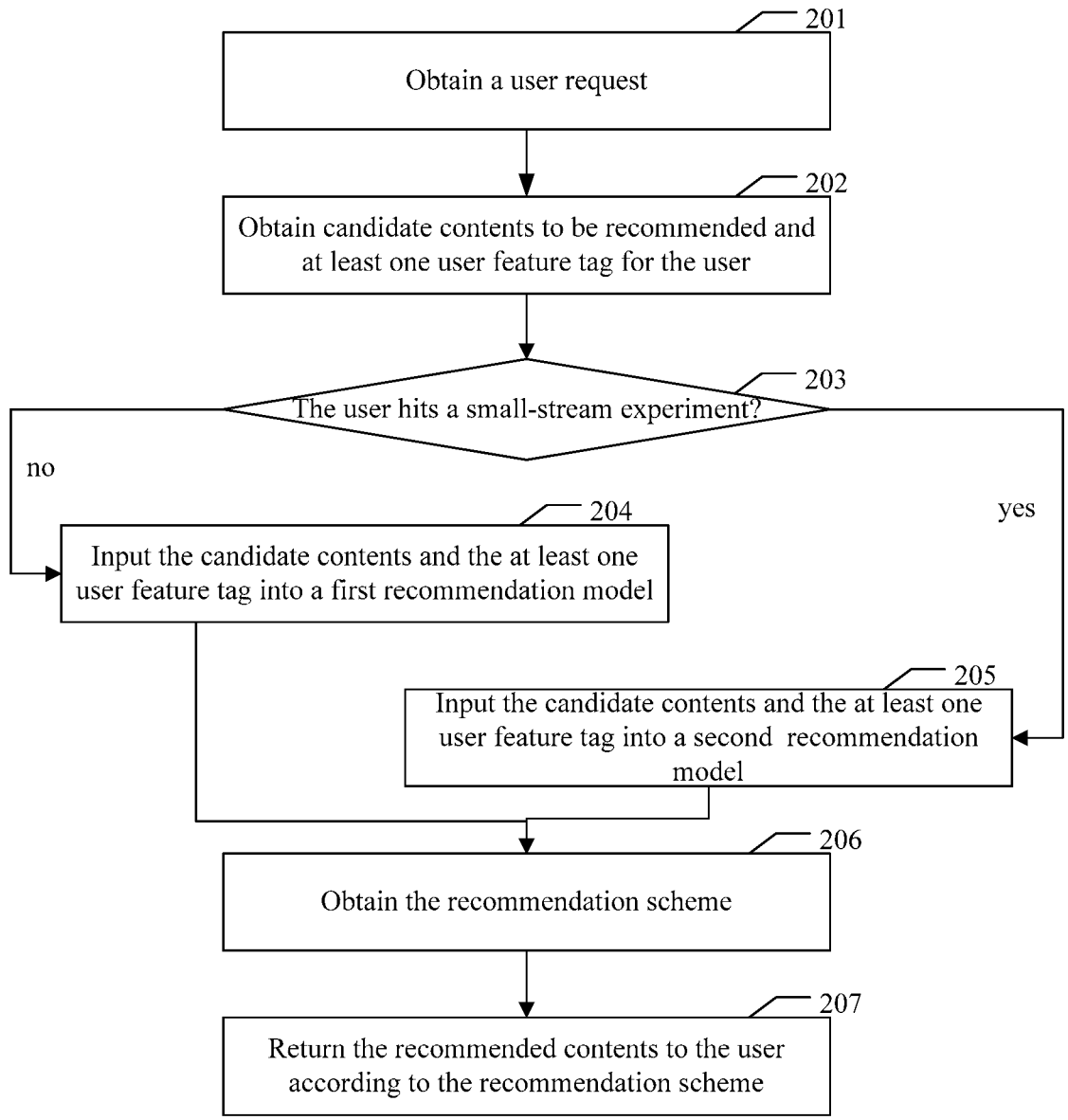
FIG. 2 illustrates a flow chart of a method for content recommendation according to some embodiments of the present disclosure.

Based on the foregoing introduction, FIG. 2 illustrates a flow chart of a method for content recommendation according to some embodiments of the present disclosure. As shown in FIG. 2, the following specific implementation is included.

At 201, a user request is obtained.

At 202, candidate contents to be recommended and at least one user feature tag of the user are obtained.

The at least one user feature tag may be generated based on the collected predetermined information of the user. The predetermined information may include: user basic attribute information and the user's user behavior information for historical recommended contents. In addition, the at least one user feature tag may be optimized and updated periodically according to collected latest predetermined information.

It is assumed that the candidate contents obtained in the embodiments consists of three types of contents: text and image, video, and live broadcast.

At 203, it is determined whether the user hits the small-stream experiment, if NO, perform 204, and if YES, perform 205.

If 95% users may be allowed to use the first recommendation model, and the remaining 5% users may be allowed to use the second recommendation model, whether the user belongs to the "5% users" may be determined. How to determine is known in the prior art.

At 204, the candidate contents and at least one user feature tag are input into the first recommendation model, and then 206 is performed.

Training samples may be constructed according to the collected user behavior information of different users for historical recommended contents, and the first recommendation model may be obtained by training according to the training samples.

At 205, the candidate contents and at least one user feature tag are input into the second recommendation model, and then 206 is performed.

The second recommendation model may be a new version of recommendation model developed by the R&D engineers. For example, compared with the first recommendation model, the structure or algorithm of the second recommendation model might change.

At 206, the output recommendation scheme is obtained and includes: respective proportions of different types of candidate contents in N pieces of recommended contents recommended to the user, the N pieces of recommended contents selected from the candidate contents according to the proportions, and an order of displaying the recommended contents in the N pieces of recommended contents. N is a positive integer greater than one and less than or equal to the number of candidate contents.

The value of N is usually smaller than the number of candidate contents. For example, the number of candidate contents is 20 and the value of N is 10, that is, 10 recommended contents will be finally displayed to the user. Assuming that the candidate contents contains 8 text and image contents, 6 video contents and 6 live broadcast contents, respectively, and assuming that the proportions of text and images, videos, and live broadcasts in the recommendation scheme are 3%, 3% and 4%, respectively, the recommendation scheme may further include which 3 text and image contents, which 3 video contents and which 4 live broadcast contents are selected, and furthermore, the recommendation scheme may further include an order of displaying the text contents, video contents and live broadcast contents, e.g., the displaying order may be: text content 1, video content 2, video content 3, live broadcast content 1, text content 2, live broadcast content 2, live broadcast content 3, text content 3, video content 1, and live broadcast content 4.

At 207, the recommended content is returned to the user according to the recommended scheme.

The user may see all recommended contents displayed according to the recommended scheme.

In addition, after a period of time, the recommendation effect of the second recommendation model may be compared with the recommendation effect of the first recommendation model. If the recommendation effect of the second recommendation model is better than that of the first recommendation model, it may be determined that the second recommendation model is better than the first recommendation model, and the second recommendation model may be used to replace the first recommendation model.

It is to be noted that, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to specific embodiments, and the involved actions and modules are not necessarily requisite for the present disclosure.

In the above embodiments, different emphasis is placed on respective embodiments, and reference may be made to related depictions in other embodiments for portions not detailed in a certain embodiment.

In one word, according to the solution of the method embodiments of the present disclosure, recommendation schemes suitable for different users may be determined according to the user feature tags of the respective users, for example, respective proportions of different types of candidate contents in N pieces of recommended contents recommended to the user, the N pieces of recommended contents selected from the candidate contents according to the proportions, and an order of displaying the recommended contents in the N pieces of recommended contents, thereby achieving personalized recommendation for different users. Furthermore, the recommended contents and the displaying order are more in line with user needs, thereby enhancing the accuracy of the recommendation results, improving the recommendation effect, maximizing the displaying effect of the recommended contents, and enabling a higher probability that the overall recommended contents are clicked by the user. The user feature tags may be optimized and updated periodically, so that the recommended contents are in line with the latest user needs, thereby further improving the recommendation effect; the recommendation scheme may be determined using the recommendation model obtained by pre-training, and the implementation mode is simple and convenient, and exhibits an excellent accuracy; the recommendation model may be periodically optimized and updated or model replacement may be performed based on the small-stream experiment, thereby optimizing the model performance and further improving the recommendation effect.

The method is described above with reference to some embodiments. An apparatus of the solution of the present disclosure will be further described with reference to some embodiments below.

Figure 3:
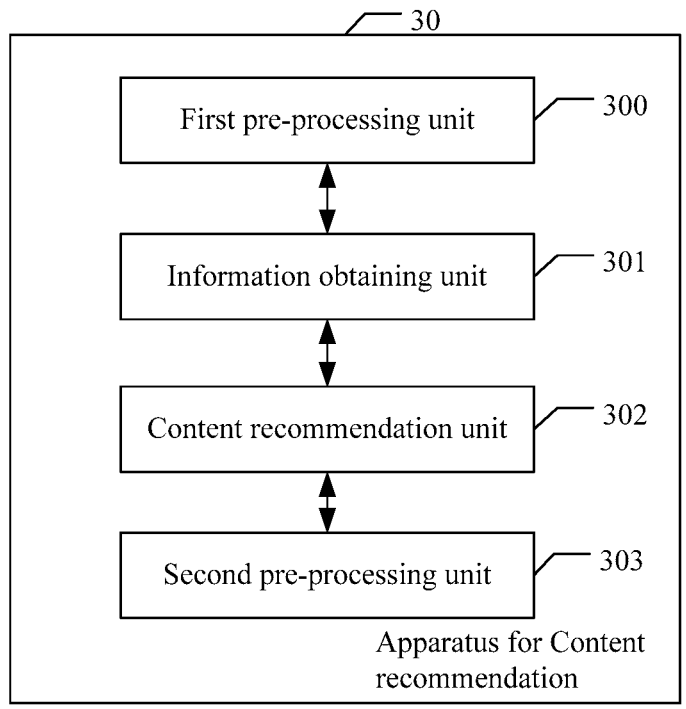
FIG. 3 illustrates a schematic diagram of an apparatus for content recommendation 30 according to some embodiments of the present disclosure.

FIG. 3 illustrates a schematic diagram of an apparatus for content recommendation according to some embodiments of the present disclosure. As shown in FIG. 3, the apparatus includes an information obtaining unit 301 and a content recommendation unit 302.

The information obtaining unit 301 is configured to obtain candidate contents to be recommended and at least one user feature tag for the user to be recommended.

The content recommendation unit 302 is configured to determine a recommendation scheme according to the candidate contents and the at least one user feature tag, including respective proportions of different types of candidate contents in N pieces of recommended contents recommended to the user, the N pieces of recommended contents selected from the candidate contents according to the proportions, and an order of displaying the recommended contents in the N pieces of recommended contents, where N is a positive integer greater than one and less than or equal to the number of candidate contents; and return the recommended contents to the user according to the recommendation scheme.

The apparatus shown in FIG. 3 may further include: a first pre-processing unit 300 configured to generate the at least one user feature tag based on the collected predetermined information of the user. The predetermined information may include: user basic attribute information and the user behavior information of the user for historical recommended contents.

The at least one user feature tag, such as a plurality of user feature tags may be generated according to the collected predetermined information, i.e., the collected predetermined information may be sorted into the user feature tags according to certain dimensions, such as youth, master degree, high salary, star chasing, science fiction movies, etc. These user feature tags can reflect the user's attributes and user's points of interest, etc.

In addition, the first pre-processing unit 300 may further periodically optimize and update the at least one user feature tag according to the collected latest predetermined information.

The content recommendation unit 302 may input the candidate contents and at least one user feature tag into a first recommendation model obtained by pre-training to obtain an output recommendation scheme.

Correspondingly, the apparatus shown in FIG. 3 may further include: a second pre-processing unit 303 configured to construct training samples according to the collected user behavior information of different users for historical recommended contents, and obtain the first recommendation model by training with the training samples.

The second pre-processing unit 303 may be further configured to optimize and update the first recommendation model periodically according to the collected latest user behavior information. And/or, the second pre-processing unit 303 may further be configured to obtain a second recommendation model, perform a small-stream experiment on the second recommendation model via the content recommendation unit 302, and replace the first recommendation model with the second recommendation model in response to determining according to results of the steam experiment that the second recommendation model is better than the first recommendation model.

Upon determining the recommendation scheme according to the candidate contents and the at least one user feature tag, the content recommendation unit 302 first determines whether the user hits the small-stream experiment, if YES, inputs the candidate contents and the at least one user feature tag into the second recommendation model to obtain the output recommendation scheme, or if NO, inputs the candidate contents and the at least one user feature tag into the first recommendation model to obtain the output recommendation scheme.

The second pre-processing unit 303 may compare the recommendation effect of the second recommendation model with the recommendation effect of the first recommendation model, and determine that the second recommendation model is better than the first recommendation model in response to determining that the recommendation effect of the second recommendation model is better than that of the first recommendation model.

A specific workflow of the apparatus according to the embodiments with reference to FIG. 3 will not be detailed here, and reference may be made to corresponding depictions in the above method embodiment.

To sum up, according to the solution of the apparatus of the embodiments of the present disclosure, recommendation schemes suitable for different users may be determined according to the user feature tags of respective users, for example, respective proportions of different types of candidate contents in N pieces of recommended contents recommended to the user, the N pieces of recommended contents selected from the candidate contents according to the proportions, and an order of displaying the recommended contents in the N pieces of recommended contents, thereby achieving personalized recommendation for different users. Furthermore, the recommended contents and the displaying order better are more in line with the user needs, thereby enhancing the accuracy of the recommendation results, improving the recommendation effect, maximizing the displaying effect of the recommended contents, and enabling a higher probability that the overall recommended contents are clicked by the user. The user feature tags may be optimized and updated periodically, so that the recommended contents are in line with the latest user needs, thereby further improving the recommendation effect; the recommendation scheme may be determined using the recommendation model obtained by pre-training, and the implementation mode is simple and convenient, and exhibits an excellent accuracy; the recommendation model may be periodically optimized and updated or model replacement may be performed based on the small-stream experiment, thereby optimizing the model performance and further improving the recommendation effect.

According to embodiments of the present disclosure, the present disclosure further provides an electronic device and a readable storage medium.

Figure 4:
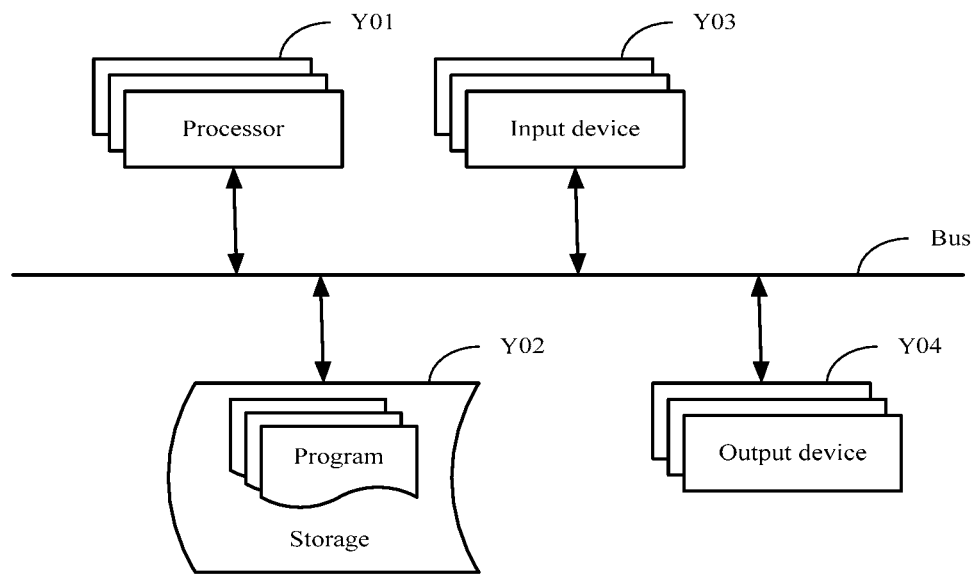
FIG. 4 illustrates a block diagram of an electronic device for implementing the method according to some embodiments of the present disclosure.

As shown in FIG. 4, it shows a block diagram of an electronic device for the method according to some embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the disclosure described and/or claimed in the text here.

As shown in FIG. 4, the electronic device includes: one or more processors Y01, a storage Y02, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the storage or on the storage device to display graphical information for a GUI on an external input/output device, such as a display device coupled to the interface. In other implementations, multiple processors and/or multiple buses may be used, as appropriate, along with multiple storages and types of storage. Also, multiple electronic devices may be connected, with each device providing portions of the necessary operations (e.g., as a server bank, a group of blade servers, or a multi-processor system). One processor Y01 is taken as an example in FIG. 4.

The storage Y02 is a non-transitory computer-readable storage medium provided by the present disclosure. Herein, the storage stores instructions executable by at least one processor, so that the at least one processor executes the method provided by the present disclosure. The non-transitory computer-readable storage medium of the present disclosure stores computer instructions, which are used to cause a computer to execute the method according to the present disclosure.

The storage Y02 is a non-transitory computer-readable storage medium and can be used to store non-transitory software programs, non-transitory computer executable programs and modules, such as program instructions/modules corresponding to the method in embodiments of the present disclosure. The processor Y01 executes various functional applications and data processing of the server, i.e., implements the method in the above method embodiment, by running the non-transitory software programs, instructions and units stored in the storage Y02.

The storage Y02 may include a storage program region and a storage data region, and the storage program region may store an operating system and an application program needed by at least one function; the storage data region may store data created according to the use of the electronic device for implementing the video blending method according to the embodiments of the present disclosure. In addition, the storage Y02 may include a high-speed random access memory, and may also include a non-transitory memory, such as at least one magnetic disk storage device, a flash memory device, or other non-transitory solid-state storage device. In some embodiments, the storage Y02 may optionally include a storage remotely arranged relative to the processor Y01, and these remote memories may be connected to the electronic device for implementing the video blending method according to embodiments of the present disclosure through a network. Examples of the above network include, but are not limited to, the Internet, an intranet, a local area network, a mobile communication network, and combinations thereof.

The electronic device for implementing the video blending method may further include an input device Y03 and an output device Y04. The processor Y01, the storage Y02, the input device Y03 and the output device Y04 may be connected through a bus or in other manners. In FIG. 4, the connection through the bus is taken as an example.

The input device Y03 may receive inputted numeric or character information and generate key signal inputs related to user settings and function control of the electronic device for implementing the video blending method according to the embodiments of the present disclosure, and may be an input device such as a touch screen, keypad, mouse, trackpad, touchpad, pointing stick, one or more mouse buttons, trackball and joystick. The output device Y04 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for content recommendation, comprising:

obtaining candidate contents to be recommended and at least one user feature tag for a user to be recommended;

determining a recommendation scheme according to the candidate contents and the at least one user feature tag, including respective proportions of different media types of candidate contents in N pieces of recommended contents recommended to the user, the N pieces of recommended contents selected from the candidate contents according to the proportions, and an order of displaying the recommended contents in the N pieces of recommended contents, wherein N is a positive integer greater than one and less than or equal to the number of candidate contents; and returning the recommended contents to the user according to the recommendation scheme, wherein the determining a recommendation scheme according to the candidate contents and the at least one user feature tag comprises:

inputting the candidate contents and the at least one user feature tag into a first recommendation model by pre-training to obtain the recommendation scheme output from the first recommendation model, and obtaining a second recommendation model, performing (203) a small-stream experiment on the second recommendation model, and replacing the first recommendation model with the second recommendation model in response to determining according to results of the small-stream experiment that the second recommendation model is better than the first recommendation model.

2. The method according to claim 1, wherein the at least one user feature tag is generated based on collected predetermined information of the user, wherein the predetermined information comprises: user basic attribute information and user behavior information of the user for historical recommended contents.

3. The method according to claim 2, further comprising:

optimizing and updating, periodically, the at least one user feature tag according to collected latest predetermined information.

4. The method according to claim 1, wherein the first recommendation model is trained by:

constructing training samples according to the collected user behavior information of different users for historical recommended contents, and obtaining the first recommendation model by training with the training samples.

5. The method according to claim 4, further comprising:

optimizing and updating, periodically, the first recommendation model according to collected latest user behavior information.

6. The method according to claim 1, wherein the performing a small-stream experiment on the second recommendation mode comprises:

upon determining the recommendation scheme according to the candidate contents and the at least one user feature tag, determining whether the user hits the small-stream experiment, if the user hits the small-stream experiment, inputting the candidate contents and the at least one user feature tag into the second recommendation model to obtain the recommendation scheme output from the second recommendation model, or if the user does not hit the small-stream experiment, inputting the candidate contents and the at least one user feature tag into the first recommendation model to obtain the recommendation scheme output from the first recommendation model; and wherein the determining according to results of the small-stream experiment that the second recommendation model is better than the first recommendation model comprises:

comparing a recommendation effect of the second recommendation model with a recommendation effect of the first recommendation model, and determining that the second recommendation model is better than the first recommendation model in response to determining that the recommendation effect of the second recommendation model is better than the recommendation effect of the first recommendation model.

7. An electronic device, comprising:

at least one processor; and a storage communicatively connected with the at least one processor; wherein, the storage stores instructions executable by the at least one processor, and the instructions are executed by the at least one processor to enable the at least one processor to perform a method for content recommendation which comprises:

obtaining candidate contents to be recommended and at least one user feature tag for a user to be recommended;

determining a recommendation scheme according to the candidate contents and the at least one user feature tag, including respective proportions of different media types of candidate contents in N pieces of recommended contents recommended to the user, the N pieces of recommended contents selected from the candidate contents according to the proportions, and an order of displaying the recommended contents in the N pieces of recommended contents, wherein N is a positive integer greater than one and less than or equal to the number of candidate contents; and returning the recommended contents to the user according to the recommendation scheme, wherein the determining a recommendation scheme according to the candidate contents and the at least one user feature tag comprises:

inputting the candidate contents and the at least one user feature tag into a first recommendation model by pre-training to obtain the recommendation scheme output from the first recommendation model, and obtaining a second recommendation model, performing (203) a small-stream experiment on the second recommendation model, and replacing the first recommendation model with the second recommendation model in response to determining according to results of the small-stream experiment that the second recommendation model is better than the first recommendation model.

8. The electronic device according to claim 7, wherein the at least one user feature tag is generated based on collected predetermined information of the user, wherein the predetermined information comprises: user basic attribute information and user behavior information of the user for historical recommended contents.

9. The electronic device according to claim 8, wherein the method further comprises:

optimizing and updating, periodically, the at least one user feature tag according to collected latest predetermined information.

10. The electronic device according to claim 7, wherein the first recommendation model is trained by:

constructing training samples according to the collected user behavior information of different users for historical recommended contents, and obtaining the first recommendation model by training with the training samples.

11. The electronic device according to claim 10, wherein the method further comprises:
optimizing and updating, periodically, the first recommendation model according to collected latest user behavior information.

12. The electronic device according to claim 7, wherein the performing a small-stream experiment on the second recommendation mode comprises:
upon determining the recommendation scheme according to the candidate contents and the at least one user feature tag, determining whether the user hits the small-stream experiment, if the user hits the small-stream experiment, inputting the candidate contents and the at least one user feature tag into the second recommendation model to obtain the recommendation scheme output from the second recommendation model, or if the user does not hit the small-stream experiment, inputting the candidate contents and the at least one user feature tag into the first recommendation model to obtain the recommendation scheme output from the first recommendation model; and
wherein the determining according to results of the small-stream experiment that the second recommendation model is better than the first recommendation model comprises:
comparing a recommendation effect of the second recommendation model with a recommendation effect of the first recommendation model, and determining that the second recommendation model is better than the first recommendation model in response to determining that the recommendation effect of the second recommendation model is better than the recommendation effect of the first recommendation model.

13. A non-transitory computer-readable storage medium storing computer instructions therein, wherein the computer instructions are used to cause the computer to perform a method for content recommendation which comprises:
obtaining candidate contents to be recommended and at least one user feature tag for a user to be recommended;
determining a recommendation scheme according to the candidate contents and the at least one user feature tag, including respective proportions of different media types of candidate contents in N pieces of recommended contents recommended to the user, the N pieces of recommended contents selected from the candidate contents according to the proportions, and an order of displaying the recommended contents in the N pieces of recommended contents, wherein N is a positive integer greater than one and less than or equal to the number of candidate contents; and
returning the recommended contents to the user according to the recommendation scheme,
wherein the determining a recommendation scheme according to the candidate contents and the at least one user feature tag comprises:
inputting the candidate contents and the at least one user feature tag into a first recommendation model by pre-training to obtain the recommendation scheme output from the first recommendation model, and
obtaining a second recommendation model, performing (203) a small-stream experiment on the second recommendation model, and replacing the first recommendation model with the second recommendation model in response to determining according to results of the small-stream experiment that the second recommendation model is better than the first recommendation model.

14. The non-transitory computer-readable storage medium according to claim 13, wherein the at least one user feature tag is generated based on collected predetermined information of the user,
wherein the predetermined information comprises: user basic attribute information and user behavior information of the user for historical recommended contents.

15. The non-transitory computer-readable storage medium according to claim 14, wherein the method further comprises:
optimizing and updating, periodically, the at least one user feature tag according to collected latest predetermined information.

16. The non-transitory computer-readable storage medium according to claim 13, wherein the first recommendation model is trained by:
constructing training samples according to the collected user behavior information of different users for historical recommended contents, and obtaining the first recommendation model by training with the training samples.

17. The non-transitory computer-readable storage medium according to claim 16, wherein the method further comprises:
optimizing and updating, periodically, the first recommendation model according to collected latest user behavior information.

* * * * *